May 13, 1924.
H. W. ANTHOLZ
STRAW SPREADER
Filed May 18, 1923.
1,493,590
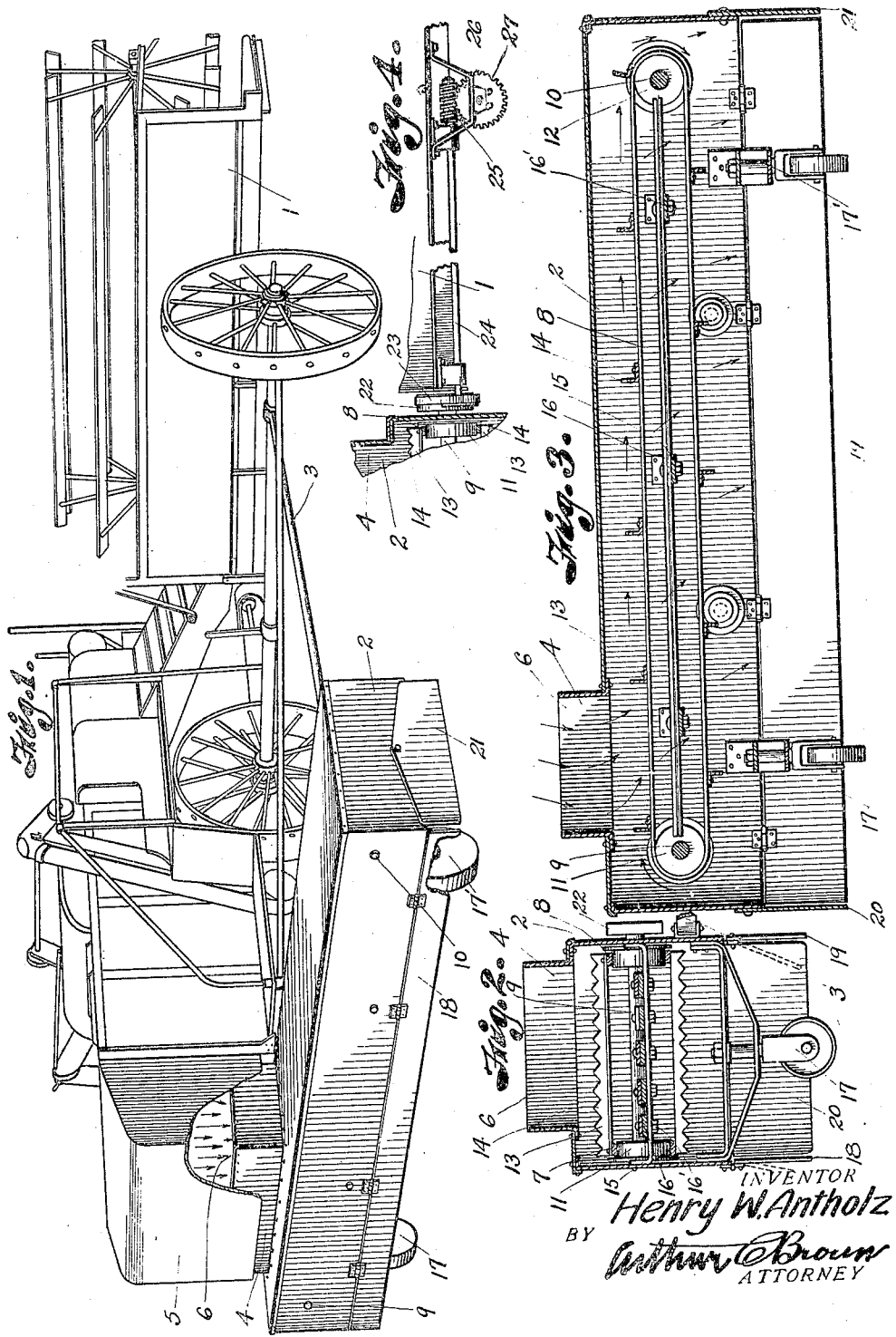
INVENTOR
Henry W. Antholz
BY Arthur C Brown
ATTORNEY Patented May 13, 1924.

1,493,590

UNITED STATES PATENT OFFICE.

HENRY W. ANTHOLZ, OF McDONALD, KANSAS.

STRAW SPREADER.

Application filed May 18, 1923. Serial No. 639,827.

*To all whom it may concern:*

Be it known that I, HENRY W. ANTHOLZ, a citizen of the United States, residing at McDonald, in the county of Rawlins and State of Kansas, have invented certain new and useful Improvements in Straw Spreaders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a straw spreader attachment for combined harvester and binder. The primary object of the invention is to provide means for spreading the straw discharged from the harvester and binder over a relatively wide area, so that the straw will constitute a fertilizer for the soil. The straw spreader is provided with means for evenly distributing the straw over the ground, and it is so constructed that it may be readily attached to a combined harvester and binder in the most convenient manner.

The invention will be understood by reference to the following description in connection with the accompanying drawings, in which:

Fig. 1, is a perspective view of a combined harvester and binder, to which my invention is applied; Fig. 2 is a cross sectional view through the straw spreader; Fig. 3 is a vertical, longitudinal, sectional view through the straw spreader; and Fig. 4 is a detailed view of the driving mechanism whereby power may be taken from the tumble rod of the harvester and binder to operate the belt on the straw spreader.

Referring now to the drawings by numerals of reference, 1 designates a combined harvester and binder of conventional design, to which my invention may be attached. The housing or casing 2 of the straw spreader may be fastened by connecting or hitch rods 3 to the harvester or binder. One hitch rod is shown, it being here explained that two hitch rods such as 3 connect the casing 2 to the harvester and binder. The casing 2 is shown as a substantially rectangular, elongated or oblong shell, having at one end an upstanding collar 4, which is preferably received within the discharge hood 5 at the end of the binder. The material drops through the opening 6, surrounded by the collar 4, and it is deposited on an endless conveyor or distributor consisting of two belts 7 and 8, passing around pulleys on the shafts 9 and 10, at the respective ends of the casing 2. There are two sets of pulleys 11 and 12 on the respective shafts 9 and 10, one on each shaft for each belt, and the belts are maintained in spaced relation by the crossing slats 13, which, preferably, have serrated upper edges 14. Between the flights of the belts is a deck consisting of the cross bars 15 and fastened to the sides of the casing are longitudinal slats 16, mounted on the bars. The longitudinal slats are in spaced relation, and they may be adjusted on the cross bars by fastening devices 16', so that the spaces between the slats can be varied. The deck is in the form of a grid so that as the straw is moved along the straw spreader, it will drop onto the grid and gravitate through it onto the ground so that the belts, slats, and grid constitute a distributor for evenly distributing the straw over the ground. The casing 2 is supported on castor wheels 17 and 17' so that they readily follow the harvester and binder to which it is attached. The bottom edge of the casing 2 has wide aprons or hinged flaps 18 and 19 and end aprons or flaps 20 and 21 so that the spreader may readily pass over uneven ground. The aprons or flaps constitute baffles for preventing the straw from blowing or being displaced during the gravitation to the ground, it being desirable to distribute the straw evenly over the surface of the field traversed by the combined harvester and binder.

The belts are driven from the pulleys on shaft 9. The shaft 9 carries pulley 22 outside the casing 2, and it is driven by a belt from the pulley 23 on the shaft 24, having a worm 25 at one end meshing with a worm gear 26 on the tumble rod shaft 27 of the harvester and binder.

It will be apparent from the foregoing that the straw spreader may be conveniently attached to a conventional harvester and binder, and that it will evenly and uniformly distribute the straw over the surface of the ground as it passes along.

What I claim and desire to secure by Letters Patent is:

1. A straw spreader comprising a hollow rectangular casing having an open bottom and a collar at the top, surrounding an opening to receive straw from the discharge hood of a harvester and binder, an endless open conveyor for moving the straw lengthwise of the casing, a deck between the flights of the conveyor, the deck comprising a grid, and wheels for supporting the casing.

2. A straw spreader, comprising an elongated casing, having an open bottom, a collar on the top, surrounding an inner opening, a horizontal endless conveyor within the casing, a grid between the flights of the conveyor, and having adjustable slats to vary the width of the spaces between the slats, and means for supporting the casing.

In testimony whereof I affix my signature.

HENRY W. ANTHOLZ.